METHOD OF MANUFACTURING PLEATED FILTERS

Original Filed March 7, 1966 2 Sheets-Sheet 1

INVENTORS
NILS O. ROSAEN
BORJE O. ROSAEN
OSCAR E. ROSAEN
BY Hauke, Kraus & Gifford
ATTORNEYS

METHOD OF MANUFACTURING PLEATED FILTERS

Original Filed March 7, 1966 2 Sheets-Sheet 2

INVENTORS
NILS O. ROSAEN
BORJE O. ROSAEN
OSCAR E. ROSAEN

BY Hauke, Kraus, & Gifford

ATTORNEYS

United States Patent Office

Re. 27,466
Reissued Aug. 22, 1972

27,466
METHOD OF MANUFACTURING PLEATED FILTERS

Nils O. Rosaen, Bloomfield Hills, Borje O. Rosaen, Ann Arbor, and Oscar E. Rosaen, Grosse Pointe, Mich., assignors to Universal Filters, Inc., Hazel Park, Mich.

Original No. 3,389,031, dated June 18, 1968, Ser. No. 532,232, Mar. 7, 1966. Application for reissue Sept. 30, 1969, Ser. No. 868,247

Int. Cl. B32b *31/16*

U.S. Cl. 156—74 13 Claims

Matter enclosed in heavy brackets [ ] appears in the original patent but forms no part of this reissue specification; matter printed in italics indicates the additions made by reissue.

ABSTRACT OF THE DISCLOSURE

A method of manufacturing flat pleated filter elements for fluid systems including the steps of forming a fluid pervious material such as perforated metal or the like into a plurality of pleats, overlaying the surface of the perforated material with a sheet of nylon, providing rods at the inside of the bends to hold the nylon against the perforated material and then molding [a thermosetting] frame around the periphery of nylon and perforated member to hold these members together.

The present invention relates to filters for fluid mediums and more specifically to an improved method of fabricating pleated filters and additionally to an improved filter formed in accodance with the aforementioned process.

Pleated filter elements are widely used in industrial applications for removing foreign substances from fluid mediums such as air, and hydraulic and lubricating oil systems. Filters of this type are particularly advantageous because of the large total area of filtering surface that can be disposed in the path of the moving fluid.

Pleated filter units are customarily formed on a self-sustaining sheet filter material formed into a plurality of relatively sharp edged ridges connected by folds. Because these sharp edged ridges are susceptible to wear due to abrasion by foreign substances in the flowing medium impinging on the leading edges of the pleats, various methods have been developed to extend the life of filters of this type such as by capping the leading and trailing edges of the pleats for the purpose of increasing the frontal area of these edges and also to strengthen these areas that are generally weakened by folding.

In addition to the above problems, conventional pleated filters are usually made of a non-rigid filter material. The pleats of materials of this character tend to open and close under pulsating or irregular fluid pressures, sometimes to the extent of opening some pleats while closing others. Because such filters are usually provided with a protective perforated sheet material or screen disposed adjacent the leading edges of the pleats, these edges, due to flexing, tend to frictionally rub against the perforated shield thereby reducing the life of the filter. One solution to the above problem has been to positively anchor the edges of the pleats to the protective screen by capping the leading and trailing edges of the pleats and then bonding these edges to the adjacent screen. It is apparent that this method of lengthening the life of pleated filters by capping the pleats in order to provide additional strength and increased frontal area and then bonding each of these capped edges to the adjacent screen involves a number of difficult manufacturing steps.

One embodiment of the present invention solves the aforementioned problems in addition to providing a number of special advantages in manufacturing pleated filters by forming a pleated perforated backing plate having a fluid pervious material such as a nylon mesh imposed on one face. The backing plate is preferably formed of metal into two sets of substantially U-shaped opposed and staggered bends connected by substantially parallel folds. The nylon mesh is firmly held in place by inserting an elongated rod member into each of one set of U-shaped bends so that the mesh is frictionally contained between the rods and the bends. The nylon mesh is formed with a lesser porosity than the perforated backing plate. The peripheral edge of the backing plate and nylon together with the ends of the rods are then imbedded in a plastic frame preferably of a thermosetting epoxy.

The framing step is dependent on the peripheral shape of the filter element. A rectangular frame is preferably formed one side at a time. A moulding container having interior cross-sectional dimensions substantially conforming to the desired frame side dimensions is prepared by coating the interior of the mold with a suitable parting agent such as the non-stick coating materials now available. A thin layer of *material such as* a fluid thermosetting epoxy is poured in the bottom of the mold over which is laid a fiber-glass sheet. A second thin layer of epoxy is poured over the sheet followed by a pair of parallel wire spacers. The fiberglass sheet and the wire spacers reinforce the frame to prevent cracking and insure that the edges of the filtering material will not extend through the edges of the frame. The plate, mesh and rods are then inserted in the mold followed by pouring a layer of epoxy to a suitable depth to imbed the downwardly disposed frame side. The mold is capped and the mold and contents [are] then *can be* cured at room temperature followed by heating in a curing oven for a time sufficient for the epoxy to assume a solid state. After cooling, the aforementioned process is repeated for each of the sides of the filter element.

A circular frame is formed by inserting the plate and nylon mesh in a suitably prepared rotatable mold having a circular molding chamber and an open face. The mold is capped with a cover provided with a fluid conducting means adapted to deliver the epoxy adjacent the circular wall of the mold chamber. The mold container is rotated and the epoxy poured therein until the desired radial thickness has been obtained. The mold *then can continue* [continues] to be rotated at room temperature and then at an elevated temperature to cure the epoxy. When the epoxy has assumed a solid state, the mold continues to rotate to assist in cooling the contents prior to removal.

By providing a rigid pleated backing plate having U-shaped bends supporting the filtering material, the improved filter eliminates the necessity for screens embracing the filter element as is utilized in conventional filters of this type. There are no sharp edge pleats requiring reinforcement or capping to obtain a suitable filter life. By utilizing a nylon mesh, an improved filtering material has been provided which has not previously been readily adaptable to filters constructed using conventional fabricating methods. The plastic framing method not only provides an improved non-corrosive frame but in addition, the aforementioned technique provides a relatively simple method for framing a unitary filter element.

It is therefore an object of the present invention to improve the method of making pleated filters comprising the steps of pleating a metallic perforated backing plate, imposing a flexible fluid pervious material against one perfortaed surface of the backing plate, and imbedding the peripheral edge of the backing plate and fluid pervious material in a thermoseting plastic frame.

It is another object of the present invention to improve the filtering characteristics and life of pleated filter elements by providing such a filter comprising a pleated, perforated filter backing plate having substantially U-shaped ridges connected by substantially parallel folds, a nylon mesh filtering material imposed adjacent one surface of the backing plate, and a plastic frame enclosing the peripheral edges of said plate and filter material.

It is still another object to improve the method of framing circular pleated filters comprising the steps of inserting the shaped filter material in a mold having a circular chamber, rotating the mold, pouring a thermosetting epoxy adjacent the rotating interior circular wall of the mold to provide a circular frame enclosing the filter material, and heating the rotating mold and contents to assist the epoxy to assume a solid state.

Still further objects and advantages will readily occur to those skilled in the art upon reference to the following detailed description and the accompanying drawings in which.

Figure 1:
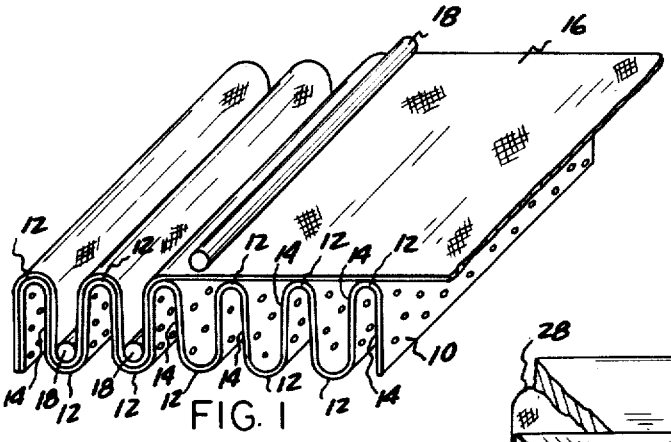
FIGS. 1–4 are diagrammatic representations of successive steps illustrating the improved method of producing pleated filters.

Now considering first the method of the invention in some detail, and referring to FIG. 1, the first step includes pleating a perforated, preferably metallic, material to form a rigid backing plate 10. The plate 10 is formed into two sets of opposed and staggered U-shaped bends such as at 12 connected by substantially parallel folds 14.

A fluid pervious material 16 preferably of a nylon mesh and having a porosity less than the perforated plate 10 is then imposed over a surface of the plate 10 by inserting a plurality of rods 18, one rod at a time, into one set of U-shaped bends 12 so that the material 16 is intermediate the rod 18 and the bend 12. The rods 18 are formed of substantially the same diameter as the bends 12.

Figure 2:
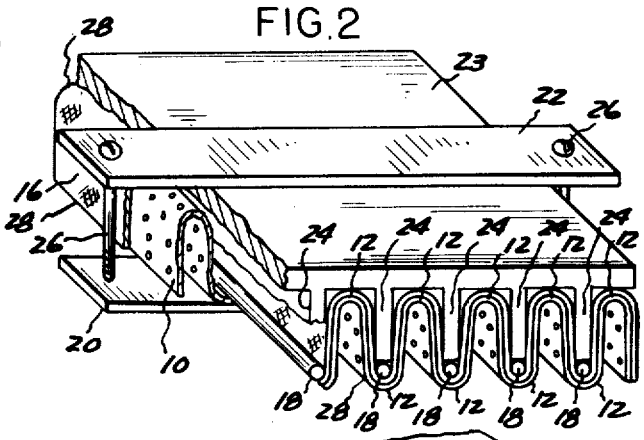

Now referring to FIG. 2, the plate 10, material 16 and rods 18 are then disposed intermediate a lower clamping member 20 and an upper clamping member 22. A block 23 has a plurality of parallel spaced ribs 24 which are forced downwardly over the rods 18 by tightening screws 26 connecting the clamping members 20 and 22 so that the bends 12 flex sufficiently to frictionally retain the rods 18 and the material 16 tightly therebetween. It is to be understood that in the aforementioned step, the material 16 is tightly drawn against the surface of the plate 10 by the rods 18. For purposes of description, the plate 10 is formed with a rectangular peripheral edge comprising four sides 28. The material 16 is trimmed adjacent the sides 28.

Figure 3:
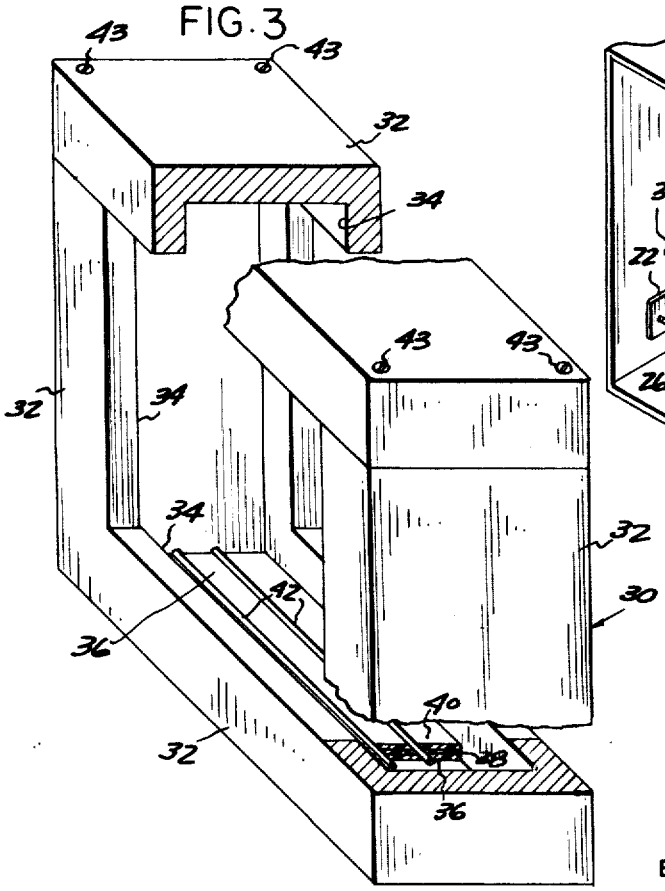
Figure 4:
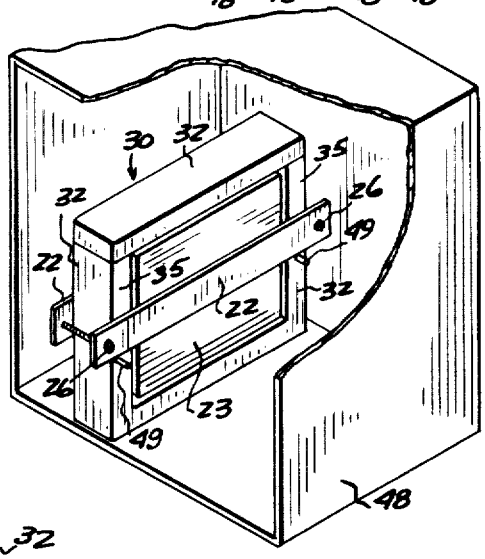

Now referring to FIGS. 3 and 4, a frame 30 having opposite sides 32 formed with inwardly disposed channels 34 is prepared by first coating the surfaces forming the channels 34 which a suitable parting agent such as the non-stick materials now available. In one preferred method, a thin layer 36 of a thermosetting plastic such as epoxy is poured into one of the channels 34 and a reinforcing material 38 such as fiberglass is disposed over the layer 36. The material 38 is preferably formed with peripheral dimensions slightly less than the cross-section of the channel 34. A second thin layer 40 of epoxy is then poured over the material 38. A pair of spaced parallel thin elongated spacing rods 42 are deposited on the layer 40. The opposite side 32 is then removed by removing the screws 43 and the pleated assembly without the block 23 and the clamping members 20, 22 but comprising the plate 10, the material 16 and rods 18 is inserted in the frame 30 so that one side 28 rests on the rods 42. The side 32 is mounted back in place and a third layer of epoxy is poured into the channel 34 to imbed the plate side 28 in a plastic frame side 46 as shown in FIG. 5 formed by the layers of epoxy, material 38 and the rods 42.

The epoxy [is] *can be* cured at room temperature for approximately thirty minutes and then the frame 30 and contents [are] *can be* deposited in a bake oven 48 as shown in FIG. 4 and heated for a time sufficient for the epoxy to assume a solid state. A preferred curing time in the oven 48 has been found to be approximately three hours at about 150–200°. During the curing steps the reinforcing material 38 functions to prevent the plastic frame side 46 from cracking.

When the plastic side 46 has cooled, the aforementioned steps are repeated to form the opposite side 46. The remaining sides are similarly formed but without the spacing rods 42.

Figure 5:
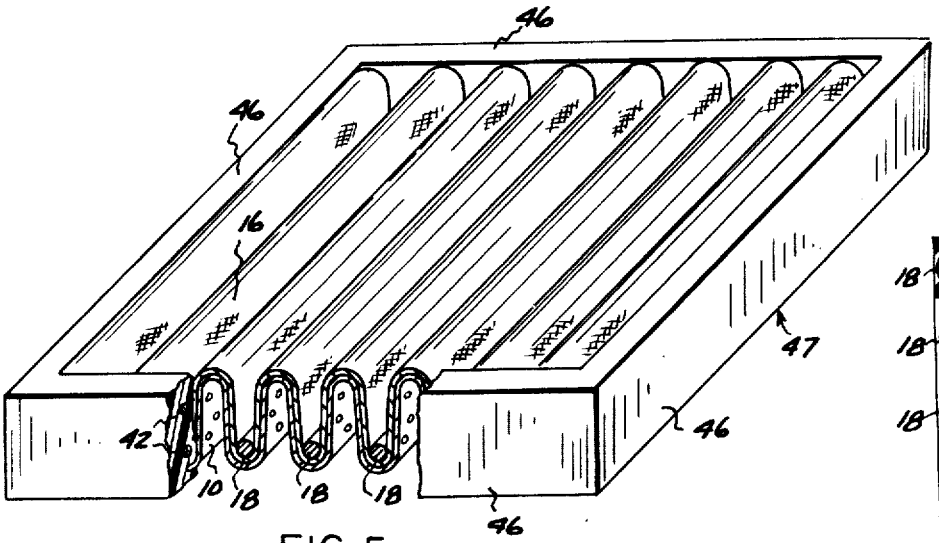
FIG. 5 is a perspective view of an improved filter made according to the improved process with parts cut away for clarity.

A completed filter element 47 as shown in FIG. 5 is then finished by cleaning the edges and sanding the top and bottom sides.

The provision of the material 38 and rods 42 is to strengthen the frame side 46 and also to insure that the edges of the plate 10 and the material 16 will not protrude through the exterior surface of the frame side 46. FIG. 4 illustrates another preferred method of forming the frame side 46 which does not require either the material 38 or the rods 42. The vertically extending sides 35 of the frame 30 are provided with outwardly extending dowels or pins 49 which engage one of the clamping members 20, 22 to maintain the lower edge of the pleated assembly slightly above the bottom of the channel 34 during the steps illustrated in FIGS. 3–4. The layer of epoxy 40 is then poured to a depth to imbed the side 28 in the plastic frame side 46. In this way, although some strength is sacrificed, the edges of the plate 10 and the material will be disposed inwardly of the exterior surface of the frame side 46 and a number of steps in the process can be eliminated.

Figure 6:
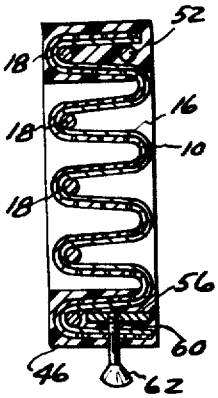
FIG. 6 is a cross sectional view of an alternative embodiment illustrating the present invention.

FIG. 6 illustrates the cross-section of an alternate embodiment of an improved rectangular filter in which a second elongated rod 52 similar to rod 18 is set in one side 46 to prevent warping and a rectangular plate 56 is set in the opposite side 46. The side 46 and plate 56 are then drilled and tapped as at 60 to accommodate a handle 62.

Figure 7:
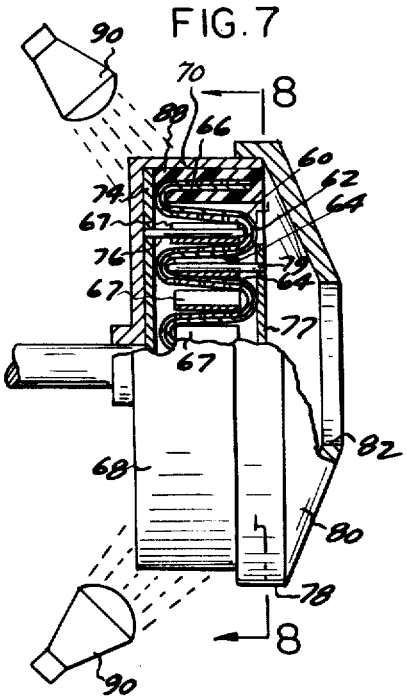
FIG. 7 is a schematic representation of the heating and rotating steps during the production of a circular filter and with parts cut away and other parts removed for clarity.
Figure 8:
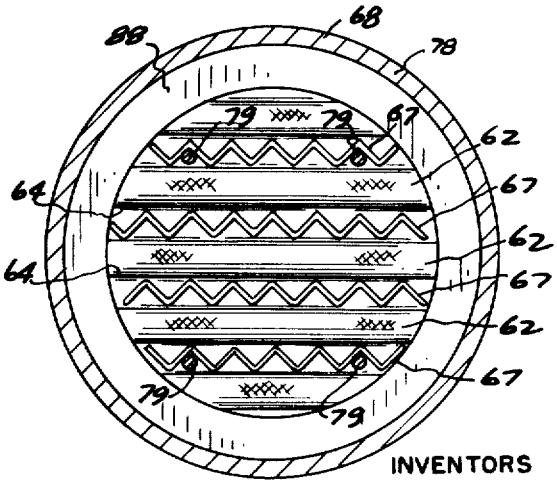
FIG. 8 is a cross sectional view taken substantially at line 8—8 of FIG. 7.

FIGS. 7–8 schematically illustrate a method of producing a circular filter 64. The preliminary steps are similar to the aforementioned steps for forming the rectangular filter 47. A perforated backing plate 60 is pleated with U-shaped bends 62 and substantially parallel folds 64. A fluid pervious material 66 is disposed adjacent a surface of the plate 60. The material 66 has a lesser porosity than the perforated backing plate 60. However, to eliminate the necessity of utilizing retaining rods of varying lengths to serve the function of the rods 18 as in the rectangular filter method, corrugated spacers 67 are inserted interjacent each of the parallel folds 64 to position the fluid pervious material 66 against the pleated surface of the plate 60 and to maintain the spacing between the plates. The pleated assembly is then cut to a circular shape and the pleated plate 60, material 66 and spacers 67 are then inserted in a rotatable container 68 having an open faced non-stick material coated circular chamber 70. An annular spacer plate 74 is disposed in the container 68 and has a plurality of parallel rows of projecting guide posts 76 which are adapted to extend through the spacers 67 to rigidly locate the perforated plate 60 in the chamber 70 during the frame forming operation. A fixture 77 is mounted over the open side of the assembly and is provided with pins 79 extending through the spacers 67 and into the pleats to aid in maintaining the assembly in position with the proper spacing between the pleats. A cover 78 having a frusto-conical central portion 80 and a central opening 82 is attached to the container 68.

As shown in FIGURE 7, the container 68 is rotated by suitable means (not shown), and the epoxy is supplied to the chamber 70 through the opening 82 so that it moves by centrifugal force to the outer edges of the container 68 to form a circular filter frame 88 of a radial thickness sufficient to imbed the peripheral edges of the plate 60 and material 66.

The frame 88 [is] *can be* cured at room temperature in the rotating container 68 for approximately one hour, then cured at an elevated temperature by heating lamps 90 or any other suitable heating means for approximately three hours until the epoxy has assumed a solid state. The rotating step continues for approximately one hour to allow the frame 88 to cool. During the cooling step, the frame 88 will experience a slight shrinkage so that it is readily removable from the container 68. The circular filter 64 is then finished by removing the plate 74 and the fixture 77, smoothing the corners and sanding the faces.

It can therefore be seen from the foregoing description that we have disclosed an improved method of making pleated filters, either rectangular or round. By utilizing a nylon mesh backed by a pleated, metallic, rigid backing plate, the screens required in conventional type filters have been eliminated in addition to utilizing an improved filtering material. By imbedding the filter edges in a [thermosetting] plastic *material,* a simpler framing method has been disclosed which produces an improved long lived non-corrosive frame. Furthermore, by forming a rigid pleated filter element having U-shaped leading and trailing edges rather than the relatively sharp edges of conventional filters, the requirement for capping such edges to resist abrasion from foreign substances in the fluid medium has been eliminated, thereby permitting an improved filter having a greatly increased efficiency and an increased useful life to be produced in a relatively few fabricating steps.

It is to be understood that although we have disclosed an improved method for producing rectangular and circular filters, the essence of the invention can be utilized to produce filters having a variety of irregularly shaped frames.

It has been found that a preferred thermosetting epoxy is a commercially available material marketed under the trade name "MARASET" comprising 644 F-2 Resin Epoxy with #75 Hardener by Marblette Corporation, Long Island, N.Y.

While it has been preferred to describe the filter elements of the present invention as including perforated sheets and material such as nylon, it is to be understood that these can be replaced by a single sheet of perforated material if this is desired. For example the backing sheet could be used alone to act as a filtering medium.

Further, if so desired, the epoxy which is used for the frames can be replaced by other suitable [thermosetting] materials and for strength can comprise an epoxy provided with a filler of metallic powders.

It is to be understood that although we have described a preferred method for producing several embodiments of our invention, various changes and modifications could be made without departing from the spirit of the invention as expressed by the scope of the appended claims.

We claim:

1. A method of manufacturing a flat pleated filter element comprising the steps of:
   (a) pleating a sheet of fluid pervious material to form a plurality of bends connected by folds,
   (b) shaping said pleated sheet in the form of a circle,
   (c) inserting said sheet in a rotatable container having a circular chamber substantially complementarily shaped to said pleated sheet,
   (d) rotating said container,
   (e) delivering a fluid thermosetting material into said rotating container for a time and of an amount sufficient for a circumferential layer of said thermosetting material to enclose the peripheral edge of said sheet, and
   (f) heating said rotating container and the contents thereof for a time and at a temperature sufficient for said thermosetting material to assume a solid state.

2. The method as defined in claim 1 and including the step of inserting corrugated spacers interjacent parallel folds of the pleated sheet prior to inserting said sheet in said rotatable container.

3. The method as defined in claim 1 and including the step of mounting a fixture on one side of the pleated sheet with pins extending into the pleats to aid in maintaining the spacing between the pleats while the sheet is being inserted in the rotatable container and during forming of the layer about the peripheral edge of the sheet.

4. A method of forming a flat, pleated filter element comprising the steps of:
   (a) pleating a sheet of rigid fluid pervious material to form a plurality of bends connected by folds,
   (b) imposing a second sheet of material of less porosity and more flexible than said first mentioned sheet of material over the first mentioned sheet,
   (c) inserting a fixture over said sheets which also has means extending within adjacent pleats of said sheets for maintaining said sheets with their surfaces adjacent so that both sheets form a pleated assembly,
   (d) placing said pleated assembly and fixture in a mold and molding a frame of thermosetting plastic material around the perimeter of said pleated assembly, and
   (e) removing said fixture only after said frame has been formed.

5. The method as defined in claim 4 and including the steps of:
   (a) placing rods intermediate the extending means of said fixture and said pleated assembly,
   (b) forming said rods of a diameter slightly greater than the curvature of the bends forming the pleats in said pleated assembly whereby upon said rods being forced into the pleats by said fixture they will be frictionally retained in place.

*6. A method of manufacturing a flat, pleated filter element comprising the steps of:*
   *pleating a sheet of fluid pervious material to form a plurality of bends connected by folds,*
   *inserting said sheet in a rotatable container having a chamber substantially complementarily shaped to said pleated sheet,*
   *rotating said container,*
   *delivering a plastic material into said rotating container for a time and of an amount sufficient for a circumferential layer of said fluid material to enclose the peripheral edge of said sheet, and*
   *rotating said container and the contents thereof for a time sufficient for said fluid material to assume a solid state.*

*7. The method as defined in claim 6 and including the step of inserting corrugated spacers interjacent parallel folds of the pleated sheet prior to inserting said sheet in said rotatable container.*

*8. The method of claim 7 and including the step of imposing a second sheet of material of less porosity and more flexible than said first mentioned sheet of material over the first mentioned sheet on the same side thereof as said corrugated spacers are inserted prior to inserting said corrugated spacers.*

*9. The method as defined in claim 6 and including the step of mounting a fixture on one side of the pleated sheet with pins extending into the pleats to aid in maintaining the spacing between the pleats while the sheet is being inserted in the rotatable container and during*

*forming of the layer about the peripheral edge of the sheet.*

*10. A method of forming a flat, pleated filter element comprising the steps of:*

*pleating a sheet of rigid fluid pervious material to form a plurality of bends connected by folds,*

*imposing a second sheet of material of less porosity and more flexible than said first mentioned sheet of material over the first mentioned sheet,*

*inserting a fixture over said sheets which also has means extending within adjacent pleats of said sheets for maintaining said sheets with their surfaces adjacent so that both sheets form a pleated assembly,*

*placing said pleated assembly and fixture in a mold and molding a frame around the perimeter of said pleated assembly, and*

*removing said fixture only after said frame has been formed.*

*11. The method as defined in claim 10 and including the steps of:*

*placing rods intermediate the extending means of said fixture and said pleated assembly,*

*forming said rods of a diameter slightly greater than the curvature of the bends forming the pleats in said pleated assembly whereby upon said rods being forced into the pleats by said fixture they will be frictionally retained in place.*

*12. A method of forming a flat, pleated filter element comprising the steps of:*

*pleating a sheet of rigid fluid previous material to form a plurality of bends connected by folds,*

*imposing a second sheet of material of less porosity and more flexible than said first mentioned sheet of material over the first mentioned sheet,*

*placing rods within pleats adjacent said second sheet of material for maintaining said sheets with their surfaces adjacent so that both sheets form a pleated assembly,*

*placing said pleated assembly in a mold and molding a frame around the perimeter of said pleated assembly.*

*13. A method of manufacturing a flat, pleated filter element comprising the steps of:*

*pleating a sheet of fluid pervious material to form a plurality of bends connected by folds,*

*inserting said sheet in a rotatable container having a chamber substantially complementarily shaped to said pleated sheet,*

*molding a frame around the periphery of said sheet by inserting said sheet in a rotatable container having a chamber substantially complementarily shaped to said pleated sheet, and by delivering the frame material in a fluid state into said rotating container for a time and of an amount sufficient for a circumferential layer of said fluid material to enclose the peripheral edges of said sheet, and rotating said container and the contents thereof for a time sufficient for said fluid material to assume a solid state.*

References Cited

The following references, cited by the Examiner, are of record in the printed file of this patent or the original patent.

UNITED STATES PATENTS

| | | | |
|---|---|---|---|
| 2,070,699 | 2/1961 | Leuthesser et al. | 210—493 |
| 3,144,315 | 8/1964 | Hunn | 55—521 |
| 3,177,637 | 4/1965 | Davis | 55—521 |
| 3,246,457 | 4/1966 | Debaun | 55—521 |
| 3,308,958 | 3/1967 | Berger et al. | 210—493 |

FOREIGN PATENTS

| | | |
|---|---|---|
| 599,661 | 6/1960 | Canada. |
| 1,160,074 | 7/1958 | France. |
| 6,769 | 3/1902 | Great Britain. |
| 680,211 | 10/1952 | Great Britain. |
| 750,099 | 6/1956 | Great Britain. |
| 806,109 | 12/1958 | Great Britain. |

BENJAMIN A. BORCHELT, Primary Examiner

G. E. MONTONE, Assistant Examiner

U.S. Cl. X.R.

156—205, 585; 210—485, 493

UNITED STATES PATENT OFFICE

CERTIFICATE OF CORRECTION

Patent No. Re. 27,466 Dated August 22, 1972

Inventor(s) Nils O. Rosaen et al

It is certified that error appears in the above-identified patent and that said Letters Patent are hereby corrected as shown below:

Column 1, line 33, "accodance" should be --accordance--.

Column 2, line 17, "moulding" should be --molding--.

Column 2, line 68, "perfortated" should be --perforated--.

Column 2, line 70, "thermoseting" should be --[thermosetting]--

Column 3, line 63, "which" should be --with--.

Column 7, line 30, delete "previous" and insert --pervious--.

Signed and sealed this 15th day of May 1973.

(SEAL)
Attest:

EDWARD M.FLETCHER,JR.
Attesting Officer

ROBERT GOTTSCHALK
Commissioner of Patents